US012767437B2

(12) United States Patent
Kögel et al.

(10) Patent No.: US 12,767,437 B2
(45) Date of Patent: Oct. 20, 2026

(54) STORAGE ARRANGEMENT

(71) Applicant: SOMIC VERPACKUNGSMASCHINEN GMBH & CO. KG, Amerang (DE)

(72) Inventors: Christoph Kögel, Prutting (DE); Norbert Eder, Traunstein (DE); Johann Hartl, Rohrdorf (DE)

(73) Assignee: SOMIC VERPACKUNGSMASCHINEN GMBH & CO. KG, Amerang (DE)

( * ) Notice: Subject to any disclaimer, the term of this patent is extended or adjusted under 35 U.S.C. 154(b) by 406 days.

(21) Appl. No.: 18/486,213

(22) Filed: Oct. 13, 2023

(65) Prior Publication Data

US 2024/0124226 A1 Apr. 18, 2024

(30) Foreign Application Priority Data

Oct. 13, 2022 (EP) .................................... 22201265

(51) Int. Cl.

| | |
|---|---|
| ***B65G 1/04*** | (2006.01) |
| ***B65G 1/12*** | (2006.01) |
| ***B65G 1/133*** | (2006.01) |
| ***B65G 54/02*** | (2006.01) |

(52) U.S. Cl.

CPC ................. *B65G 1/04* (2013.01); *B65G 1/12* (2013.01); *B65G 1/133* (2013.01); *B65G 54/02* (2013.01)

(58) Field of Classification Search

CPC ........... B65G 54/02; B65G 1/133; B65G 1/12

See application file for complete search history.

(56) References Cited

U.S. PATENT DOCUMENTS

| | | | | |
|---|---|---|---|---|
| 2020/0030995 | A1* | 1/2020 | Lu | B25J 15/065 |
| 2022/0234825 | A1* | 7/2022 | Krishnamoorthy | B65G 25/06 |
| 2023/0286749 | A1* | 9/2023 | Warrier | B65G 1/1378 |
| 2023/0303328 | A1* | 9/2023 | Gil | B65G 1/137 |

FOREIGN PATENT DOCUMENTS

| | | | |
|---|---|---|---|
| EP | 2248740 | A1 | 11/2010 |

OTHER PUBLICATIONS

European Application No. 22201265.0, "European Search Report" mailed Mar. 2023, 2 pages.

* cited by examiner

*Primary Examiner* — Saul Rodriguez
*Assistant Examiner* — Juan S Moscoso
(74) *Attorney, Agent, or Firm* — Kilpatrick Townsend & Stockton LLP

(57) ABSTRACT

The invention relates to a storage arrangement for storing movers of a conveying device formed in magnetic levitation technology, comprising a storage device having a plurality of storage levels arranged one above the other in the height direction, each having a plurality of storage locations, and a transfer device that is designed to transfer at least one of the movers from a work surface of the conveying device to at least one of the storage locations or from at least one of the storage locations to the work surface of the conveying device, wherein the storage arrangement is made of a non-magnetizable material. According to the invention, the storage locations of the storage device are fixedly arranged in the height direction. Furthermore, the transfer device comprises a transfer unit that can be adjusted in the height direction.

11 Claims, 4 Drawing Sheets

STORAGE ARRANGEMENT

CROSS REFERENCE TO RELATED APPLICATION

This application claims priority to European Patent Application No. 22201265.0, filed in Europe on Oct. 13, 2022, the entire contents of which are hereby incorporated herein by this reference.

DESCRIPTION

The invention relates to a storage arrangement for storing movers not belonging to the storage arrangement of a conveying device formed in magnetic levitation technology and also not belonging to the storage arrangement, the storage arrangement comprising a storage device having a plurality of storage levels arranged one above the other in the height direction, each having a plurality of storage locations, and a transfer device that is designed to transfer at least one of the movers from a work surface of the conveyor to at least one of the storage locations or from at least one of the storage locations to the work surface of the conveyor, wherein the storage arrangement is made of a non-magnetizable material.

Human intervention is usually required to direct movers to or away from such a conveying device. The movers must be removed from the storage device by hand and placed on the conveying device or removed from the conveying device by hand and placed in the storage device. One problem that arises with such a manual mover change is dealing with the magnetic fields that emanate from the permanent magnets installed in the movers. These magnetic fields are so strong that, for example, people with pacemakers should not perform the mover change, or that there is even a risk of injury for the operator who performs mover change from the metal strap of a watch.

In order to minimize or completely exclude this risk, a storage arrangement for automated mover changes was proposed in FIGS. 36 and 37 of US 2020/0030995 A1. The storage device of this storage arrangement has a plurality of storage levels arranged one above the other, each of which in turn has a plurality of storage locations for movers. To store a mover in a specific storage level or remove it therefrom, the storage device is adjusted in the height direction until the storage level in question is located at the level of the work surface of the conveying device. Only when this is the case will the transfer device located at the level of the work surface of the conveying device be activated.

In the generic storage arrangement, it turned out in practice that the storage or removal process takes a relatively long time.

The object of the present invention is to remedy this.

This object is achieved by a storage arrangement of the type mentioned at the outset, in which the storage locations of the storage device are fixedly arranged in the height direction and the transfer device comprises a transfer unit that can be adjusted in the height direction.

It is to the credit of the inventors to have recognized that the low speed of the storage or removal of the movers is, among other things, due to the fact that, in order to control the individual storage levels, the entire storage arrangement, including the mover that is currently being stored therein, must always be moved in the height direction. Due to the measures according to the invention, the mass to be moved can be significantly reduced, which has an advantageous effect not only on the time required for storing or removing a mover, but also on the energy requirement associated with this process.

In order to be able to further accelerate the storage or removal of a mover, it is further proposed that the parts of the storage arrangement whose distance from the movers can fall below a predetermined value during operation, preferably the entire storage arrangement, are made of a material whose electrical conductivity does not exceed a predetermined limit value, preferably of an electrically non-conductive material. Since the magnetic field of the permanent magnets, which is moved when a mover is stored or removed, induces eddy currents in an electrically conductive material, which eddy currents attempt to brake the movement of the mover, the use of electrically conductive materials makes it difficult to store or remove the movers even if these conductive materials are not magnetic. This effect is counteracted by the measure according to the invention. Since the eddy current braking effect decreases with the distance between the electrically conductive material and the moving magnetic field, a frame of the storage device, which is always at a certain distance from the movers, can be made of a metallic but non-magnetic material, for example aluminum. However, the use of plastics is recommended for all other parts of the storage arrangement.

According to a first alternative embodiment of the invention, it is proposed that the storage locations of the storage device be adjustable in at least one direction different from the height direction. This measure simplifies the design of the storage arrangement because the movements of the storage locations in the storage device and the transfer device can be decoupled from one another.

For example, it can be provided that the adjustability of the storage locations is designed such that the storage locations can be moved in a linear direction away from or toward the transfer device. This only allows storage and removal according to the LIFO principle (last in, first out). However, because a large number of identical movers of a first type are usually replaced by a large number of identical movers of a second type in the case of a format change, this is not a limitation in practice.

In order to be able to access each storage location individually, however, the adjustability of the storage locations can also be designed such that the storage locations can be moved along a closed path past the transfer device. In this case, the storage device can be designed, for example, as a storage carousel.

According to a second alternative embodiment of the invention, however, it can also be provided that the transfer unit of the transfer device can also be adjusted in at least one other than the height direction in addition to being adjustable in the height direction. This embodiment can be designed, in a manner known per se, in the manner of an X-Y adjustment oriented in the vertical direction. In this case, the storage locations in the storage device can be rigidly arranged. For example, the storage device can be designed in the manner of a shelf having a plurality of shelf boards arranged one above the other.

According to a third alternative embodiment of the invention, however, it can also be provided that the transfer device has a plurality of transfer units, which are preferably jointly adjustable in the height direction. In this case, the storage device can also be designed in the manner of a shelf with a plurality of shelf boards arranged one above the other. The plurality of transfer units can in each case simultaneously store or remove a corresponding plurality of movers on one of the shelves.

In a further development of the invention, it can also be provided that the storage device is designed to be mobile. In the context of the present invention, the word "mobile" does not refer to a movement of the storage device per se, for example, as in the design as a storage location carousel, but rather to a movement of the storage device as a whole away from or toward the conveying device. Such mobility makes it possible to remove the movers stored in the storage device during a format change, which improves the accessibility of the conveying device during conveying operation. Of course, the mobile storage device can be moved back to the conveying device for a later format change.

In this context, but not only in this context, it can be advantageous if the storage device is at least partially enclosed by boundary walls. These boundary walls can, for example, prevent the movers from falling out of the storage locations. In this case, a storage shelf becomes a storage cabinet.

In order to be able to transfer the movers to or from the storage locations in a reliable and reproducible manner, it is proposed that the transfer unit has a gripper element. This gripper element can be formed, for example, by a suction gripper.

In a further development of the invention, it can also be provided that each storage location is designed to receive a plurality of movers. This embodiment requires only that the gripper element of the transfer unit can operate each of the storage surfaces of the storage location.

The invention will be explained in greater detail below on the basis of exemplary embodiments with reference to the accompanying drawings.

Figure 1:
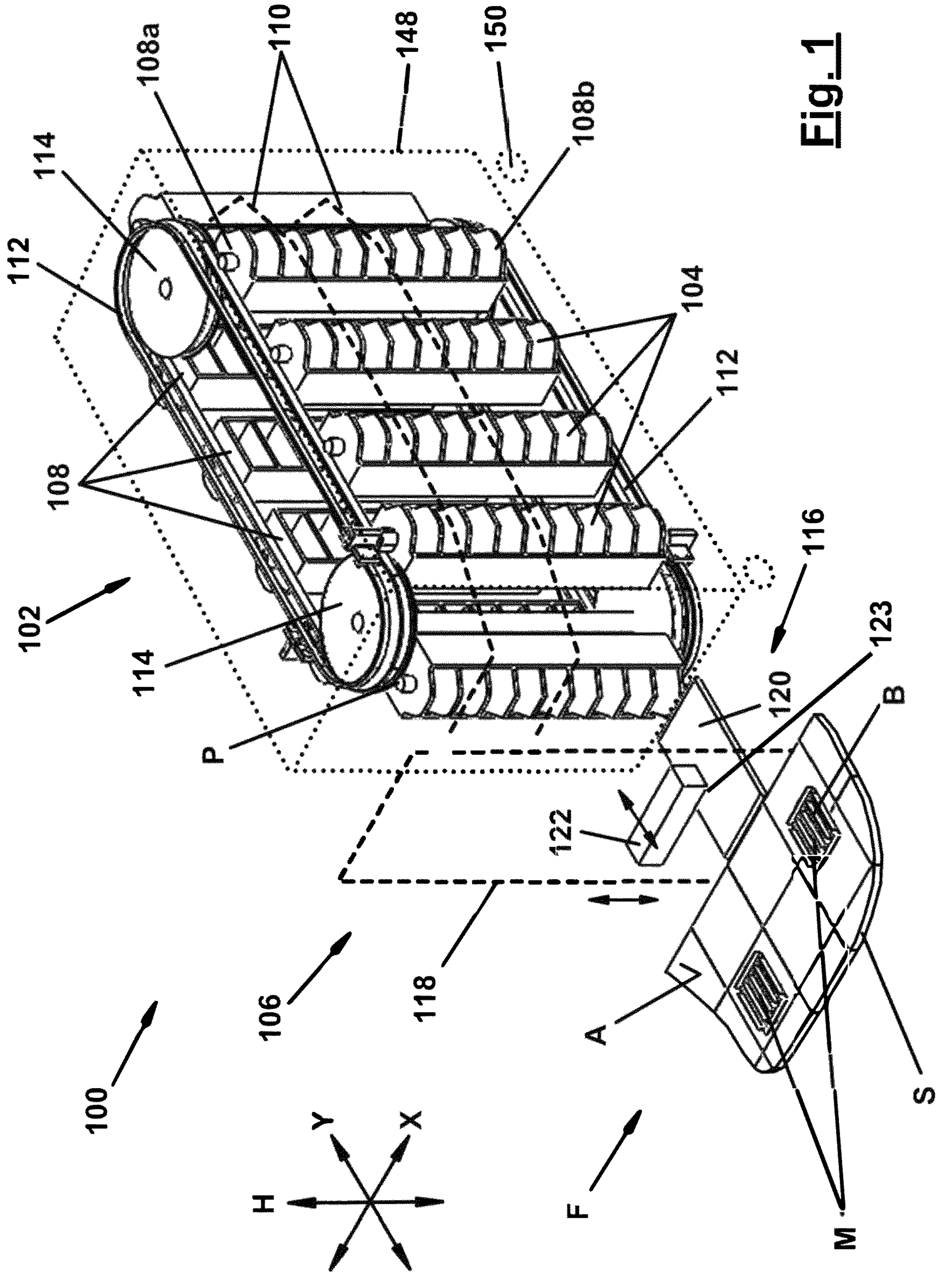
FIG. 1 depicts a perspective view of a first embodiment of a storage arrangement according to the invention.

In FIG. 1, a storage arrangement according to the invention is designated quite generally with the number 100. The storage arrangement 100 is associated with a conveying device F formed in magnetic levitation technology.

The conveying device F comprises a stator arrangement S, the surface of which forms a work surface A of the conveying device F, and a plurality of movers M, of which only two are shown in FIG. 1 for the sake of clarity. The movers M are each equipped with a plurality of permanent magnets that interact with a magnetic field generated by the stator arrangement S. By corresponding control of the stator arrangement S and thus control of the magnetic field, the movers M can be lifted off the work surface A and moved longitudinally thereon.

To transport products, the movers M are usually equipped with supports B, the design of which is adapted to the number and shape of the respective products. In the case of a format change, i.e., the transition from a first product type to a second product type, the movers that are currently located on the work surface must be replaced with movers whose supports B are adapted to the second product type. This is facilitated by the storage arrangement 100 according to the invention.

For this purpose, the storage arrangement 100 comprises a storage device 102 having a plurality of storage locations 104 and a transfer device 106 that is designed to transfer, mover by mover, from the work surface A to at least one of the storage locations 104, or vice versa.

In the embodiment shown in FIG. 1, the storage device 102 is designed in the manner of a carousel. In particular, the storage device 102 comprises a plurality of vertical stacks 108, each of which comprises a plurality of storage locations 104 that are cannot be adjusted in the height direction H. In this case, the storage locations 104 of adjacent stacks 108 are each arranged in pairs at the same height, so that overall they form a plurality of storage levels 110 arranged one above the other in the height direction H. In FIG. 1, two of these storage levels 110 are indicated schematically by a dashed line by way of example.

The upper ends **108*a* and the lower ends 108*b* of the stacks 108 are each connected to a conveyor belt 112 that runs around two pulleys 114, wherein only the upper pulleys are visible in FIG. 1. By corresponding rotation of the pulleys 114, each of the stacks 108 can be brought into a loading and unloading position P in which the storage locations 104 of the relevant stack 108 can interact with the transfer device 106. As a result of this rotation, the stacks 108 are temporarily moved in the X direction on the transfer device 106**.

According to the invention, the transfer device 106 comprises a transfer unit 116 that can be adjusted in the height direction H by means of a lifting unit 118. The transfer unit 116 in turn comprises a lifting platform 120 and an engagement device 122.

In order to transfer a mover M from the stator arrangement S to a predetermined storage location 104, the procedure is as follows. First, the mover M is moved by magnetic levitation technology from the work surface A onto the lifting platform 120 of the transfer unit 116. The transfer unit 116 is then adjusted in the height direction H by means of the lifting unit 118 until the lifting platform 120 is arranged at the same height as the predetermined storage location 104. The mover M is now displaced from the lifting platform 120 to the predetermined storage location 104 by means of the engagement device 122. In the illustration of FIG. 1, this adjustment takes place in the Y direction. The transfer unit 116 then returns to the height level of the work surface A.

To transfer a mover M from a predetermined storage location 104 to the work surface A of the stator arrangement S in an analogous but reversed sequence of the steps.

To facilitate the transition from the work surface A to the lifting platform 120 and/or from the lifting platform 120 to the predetermined storage location 104, the lifting platform 120 can be designed as a conveyor, for example as a belt conveyor. Furthermore, the engagement device 122 can comprise a gripper element 123, for example a suction gripper.

To avoid a direct magnetic interaction between the permanent magnets installed in the movers M and the storage arrangement 100, i.e., an interaction based on the orientation of magnetic dipoles present in the materials of the storage arrangement 100, the storage arrangement 100 is, according to the invention, made of a non-magnetizable material. These can be, for example, plastics, but also metals such as copper or aluminum.

In order to also be able to prevent an indirect interaction between the permanent magnets installed in the movers M and the storage arrangement 100, i.e., an interaction based on magnetic induction, according to the invention at least those portions of the storage arrangement 100 that come close to the movers M should be made of a material whose electrical conductivity does not exceed a predetermined limit value, preferably of an electrically non-conductive material. These can be, for example, plastics, but not metals in which eddy currents can be induced.

Figure 2:
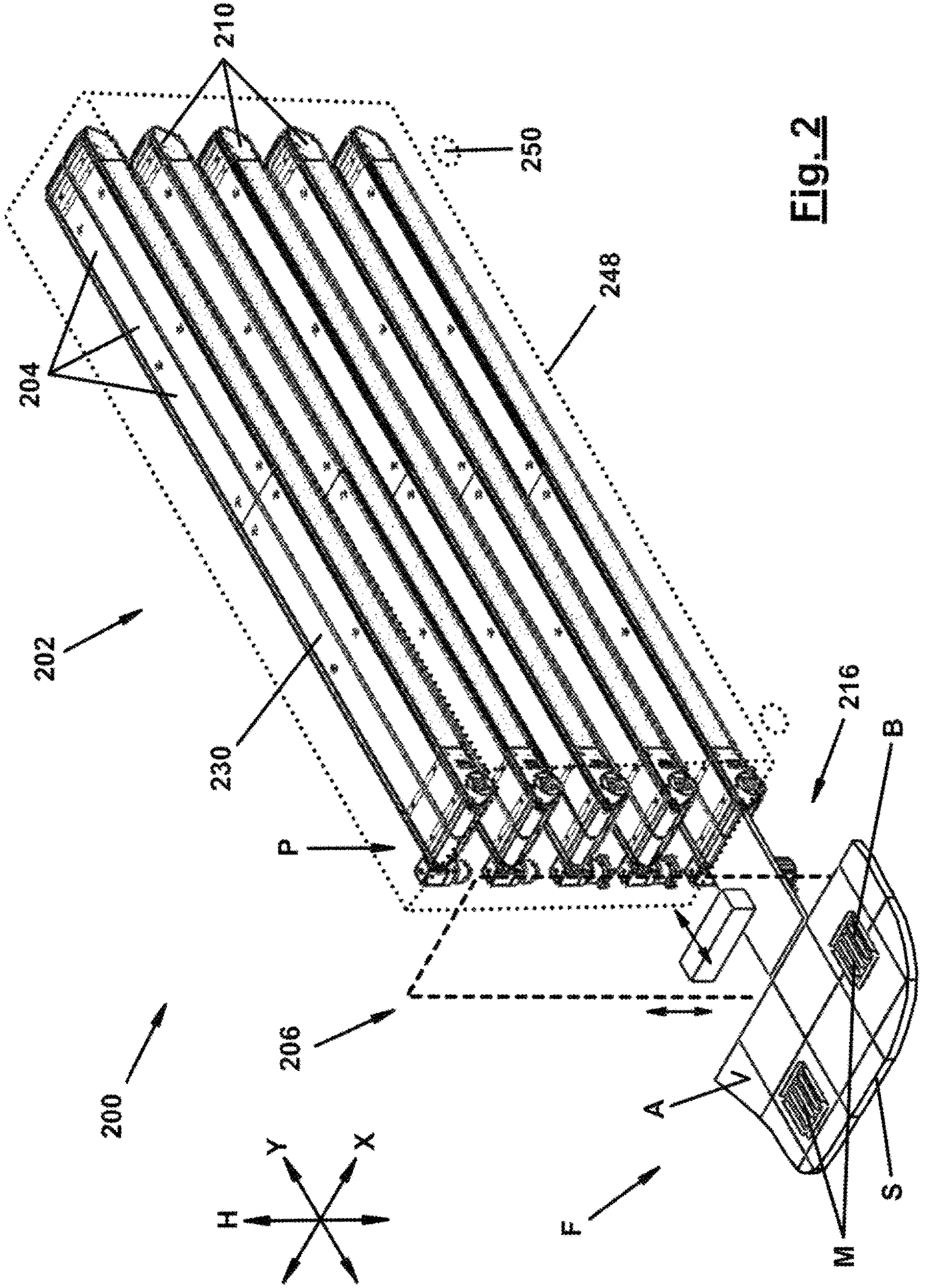
FIG. 2 depicts a perspective view of a second embodiment of a storage arrangement according to the invention.

FIG. 2 shows a second embodiment of the storage arrangement according to the invention, which substantially corresponds to features of the storage arrangement of FIG. 1. Therefore, analogous parts in FIG. 2 are provided with the same reference signs as in FIG. 1, but increased by 100. In addition, the storage arrangement 200 of FIG. 2 will be described below only insofar as it differs from the storage arrangement 100 of FIG. 1, to the description of which reference is hereby expressly made.

The storage arrangement 200 of FIG. 2 differs from the storage arrangement 100 of FIG. 1 only in that the storage device 202 is not designed as a circulating carousel, but in that each of the storage levels 210 is formed by a conveyor belt 230, each of which has a plurality of storage locations 204. This has the consequence that the individual storage locations 204 cannot be controlled individually, but instead each of the conveyor belts 230 can only be loaded with and emptied of movers M according to the LIFO principle (last in, first out). However, because a large number of identical movers of a first type are usually replaced by a large number of identical movers of a second type in the case of a format change, this is not a limitation in practice.

With regard to the structure and function of the transfer device 206, reference is made to the description of the transfer device 106 and the transfer unit 216 of the embodiment of FIG. 1.

Figure 3:
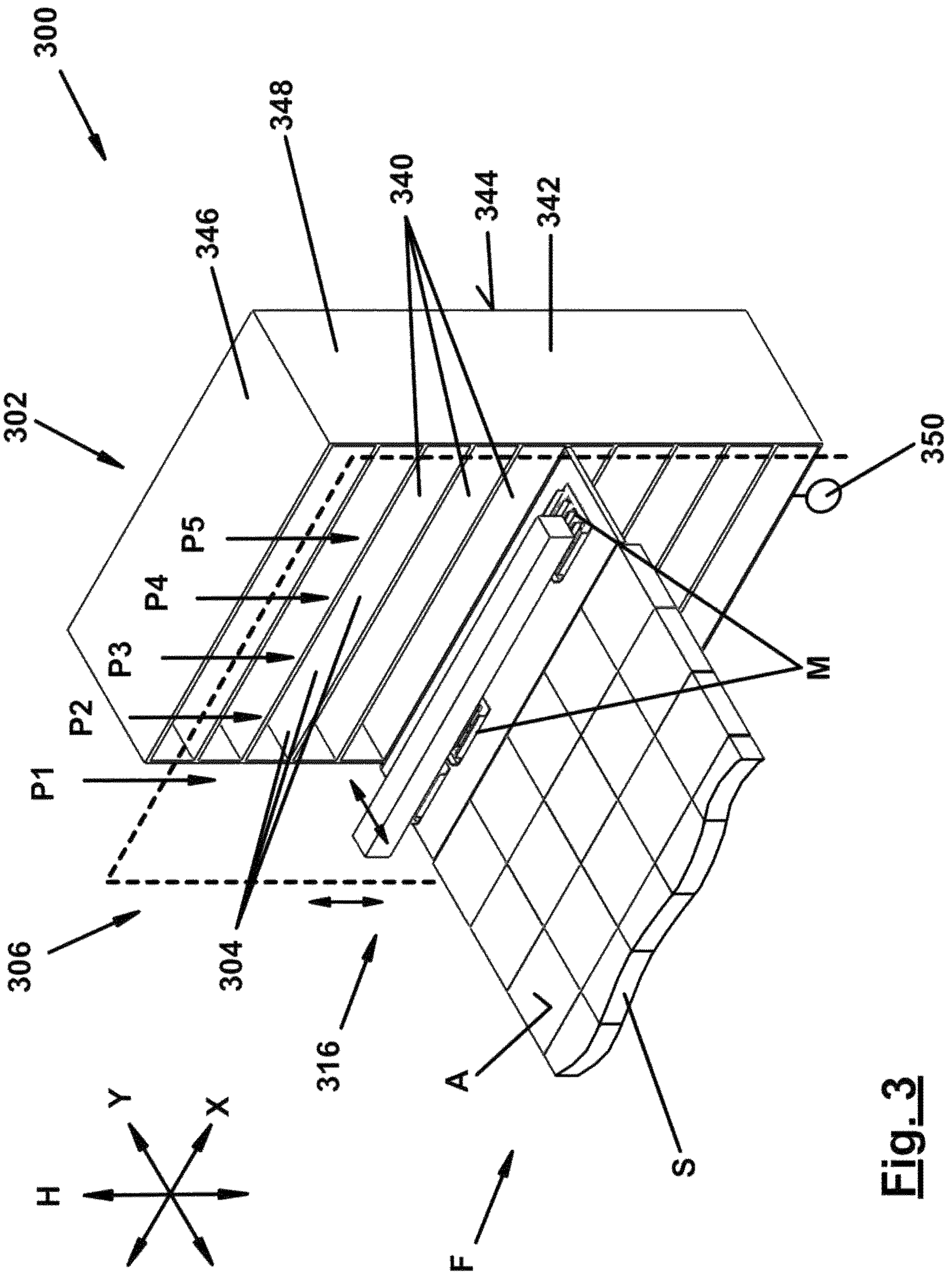
FIG. 3 depicts a perspective view of a third embodiment of a storage arrangement according to the invention.

FIG. 3 shows a third embodiment of the storage arrangement according to the invention, which substantially corresponds to features of the storage arrangement of FIG. 1. Therefore, analogous parts in FIG. 3 are provided with the same reference signs as in FIG. 1, but increased by 200. In addition, the storage arrangement 300 of FIG. 3 will be described below only insofar as it differs from the storage arrangement 100 of FIG. 1, to the description of which reference is hereby expressly made.

The storage arrangement 300 of FIG. 3 differs from the storage arrangement 300 of FIG. 1 in that the storage device 302 is designed as a storage shelf having a plurality of shelf compartments 340 arranged one above the other in the height direction H, each of which has a predetermined number of storage locations 304.

The immobility of the shelf compartments 340 in comparison with the conveyor belts 230 of the embodiment of FIG. 2 is compensated for in the embodiment of FIG. 3 in that the transfer device 306 has a plurality of loading and unloading positions P1 to P5, one for each storage location 304 of each shelf compartment 340. Accordingly, the transfer unit 316 is also designed to be able to simultaneously remove a mover M from each of these storage locations 304 or to store it in them, or a number of transfer units 316 that are identical to a plurality of movers M are provided for this purpose, which are adjustable together.

It should also be noted that the storage device 302 is designed as a closed shelf, i.e., has side walls 342, a rear wall 344, and a top wall 346. The bottom wall is formed by the lowest shelf compartment 340. Furthermore, the storage device can also have front doors (not shown). Together, these walls form a housing 348.

Furthermore, as indicated in FIG. 3 by rollers 350, the storage device 302 can be designed as a mobile storage device that can be moved away from the conveying device F after the movers M have been stored or toward the conveying device F to retrieve the movers M.

Furthermore, it can be seen in FIG. 3 that the storage device 302 is designed to be deep enough in the Y direction that each storage location 304 can receive a plurality of movers M (in this case two) arranged one behind the other in the Y direction.

It should be noted that the storage devices 102 according to FIGS. 1 and 202 according to FIG. 2 can also be equipped with a housing 148 or 248 and/or rollers 150 or 250, as indicated by dotted lines in FIGS. 1 and 2.

Figure 4:
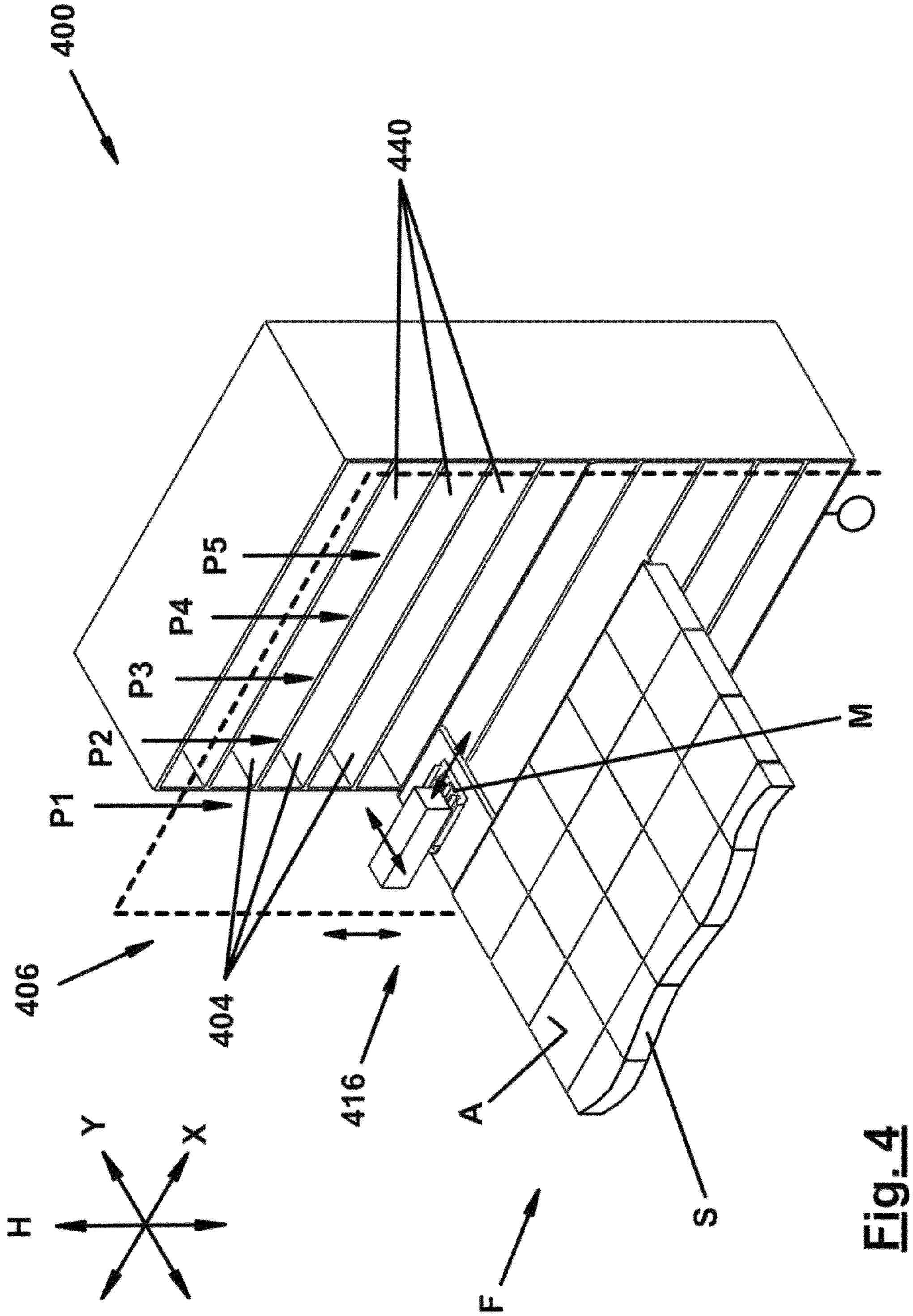
FIG. 4 depicts a perspective view of a variant of the third embodiment.

FIG. 4 shows a variant of the third embodiment of the storage arrangement according to the invention. Therefore, analogous parts in FIG. 4 are provided with the same reference signs as in FIG. 3, but increased by 100, i.e., by 300 compared to FIG. 1. In addition, the storage arrangement 400 of FIG. 4 will be described below only insofar as it differs from the storage arrangement 300 of FIG. 3, to the description of which reference is hereby expressly made.

The only difference from the embodiment of FIG. 3 is that the transfer unit 416 of the transfer device 406 of the storage arrangement 400 can only move a single mover M at a time. In order to nevertheless be able to supply all storage locations 404 of the shelf compartments 440 with movers M, the transfer device 406 is designed such that it can adjust the transfer unit 416 not only in the height direction H, but also in the X direction.

The invention claimed is:

1. A storage arrangement for storing movers not belonging to the storage arrangement of a conveying device formed in magnetic levitation technology and also not belonging to the storage arrangement, the storage arrangement comprising:

a storage device having a plurality of storage levels arranged one above the other in a height direction, each storage level of the plurality of storage levels having a plurality of storage locations; and a transfer device configured to transfer at least one of the movers (i) from a work surface of the conveying device to at least one of the storage locations or (ii) from at least one of the storage locations to the work surface of the conveying device, wherein the storage arrangement is made of a non-magnetizable material, wherein the plurality of storage locations of the storage device are fixedly arranged in a spatially related height direction relative to a frame of the storage device, and wherein the transfer device comprises a transfer unit that is adjustable in the height direction.

2. The storage arrangement according to claim 1, wherein one or more parts of the storage arrangement are made of an electrically non-conductive material.

3. The storage arrangement according to claim 1, wherein the plurality of storage locations of the storage device are adjustable in at least one direction different from the height direction.

4. The storage arrangement according to claim 3, wherein the plurality of storage locations are adjustable in a linear direction away from or toward the transfer device.

5. The storage arrangement according to claim 3, wherein the plurality of storage locations are adjustable along a closed path passing the transfer device.

6. The storage arrangement according to claim 1, wherein the transfer unit of the transfer device is adjustable in both the height direction and at least one direction different from the height direction.

7. The storage arrangement according to claim 1, wherein the transfer device comprises a plurality of transfer units that are jointly adjustable in the height direction.

8. The storage arrangement according to claim 1, wherein the storage device is mobile.

9. The storage arrangement according to claim 1, wherein the storage device is at least partially enclosed by boundary walls.

10. The storage arrangement according to claim 1, wherein the transfer unit comprises a gripper element.

11. The storage arrangement according to claim 1, wherein each storage location of the plurality of storage locations is configured to receive a plurality of movers.

* * * * *